United States Patent [19]

Oliver

[11] Patent Number: 5,842,364
[45] Date of Patent: *Dec. 1, 1998

[54] VEHICLE IMMOBILIZING SYSTEM

[76] Inventor: Richard D. Oliver, 7760 Ziegler, Taylor, Mich. 48180

[ * ] Notice: This patent issued on a continued prosecution application filed under 37 CFR 1.53(d), and is subject to the twenty year patent term provisions of 35 U.S.C. 154(a)(2).

[21] Appl. No.: 667,507

[22] Filed: Jun. 21, 1996

[51] Int. Cl.$^6$ .................................................. B60R 25/08
[52] U.S. Cl. ........................... 70/202; 70/237; 74/483 K; 74/512; 188/265; 303/89
[58] Field of Search ............................. 70/201–203, 237, 70/198–200, 228, 254, 257; 477/197; 74/512, 483 K; 192/13 A; 188/265; 303/89

[56] References Cited

U.S. PATENT DOCUMENTS

| | | | |
|---|---|---|---|
| 1,201,390 | 10/1916 | Theobald | 70/201 |
| 1,207,395 | 12/1916 | Goldmerstein | 70/280 |
| 1,210,640 | 1/1917 | Goldmerstein | 70/280 |
| 1,271,941 | 7/1918 | Reiser . | |
| 1,275,126 | 8/1918 | Campbell . | |
| 1,343,731 | 6/1920 | Kyle | 70/280 |
| 1,860,785 | 5/1932 | Picollo | 70/202 |
| 1,972,300 | 9/1934 | Hemingway, Jr. . | |
| 2,156,387 | 5/1939 | Goldfinger | 292/144 |
| 2,471,293 | 5/1949 | Truesdell | 70/254 |
| 4,432,432 | 2/1984 | Martin | 180/287 |
| 4,887,702 | 12/1989 | Ratke et al. | 70/248 X |
| 4,903,510 | 2/1990 | Surles | 70/202 |
| 5,001,913 | 3/1991 | Gamboni | 70/202 |
| 5,010,750 | 4/1991 | Böser et al. | 70/283 X |
| 5,027,929 | 7/1991 | Ratke et al. | 70/248 X |
| 5,040,387 | 8/1991 | Knott, Jr. | 70/202 |
| 5,078,242 | 1/1992 | Ratke et al. | 70/248 X |
| 5,586,457 | 12/1996 | Keener | 70/201 |

FOREIGN PATENT DOCUMENTS

| | | | |
|---|---|---|---|
| 641766 | 5/1962 | Canada | 70/201 |
| 0066044 | 12/1982 | European Pat. Off. | 70/237 |
| 623702 | 8/1961 | Italy | 70/202 |
| WO90/09912 | 9/1990 | WIPO | 70/237 |

*Primary Examiner*—Lloyd A. Gall
*Attorney, Agent, or Firm*—Charles W. Chandler

[57] ABSTRACT

A vehicle immobilizing system for engaging a brake pedal of a vehicle and locking the brakes of the vehicle in an activated position, but which does not interfere with the operation of the vehicle's brakes when the vehicle is being operated. The vehicle immobilizing system includes a standard vehicle brake pedal assembly, a retractable locking shaft, a solenoid, for extending and retracting the retractable locking shaft, a locking tumbler to prevent the retractable locking shaft from being physically forced open to deactivate the vehicle's brakes, and an activation switch for the immobilizing system. The retractable locking shaft is attached to the sidewall of a standard vehicle brake pedal assembly so as to prevent the upward movement of the brake pedal arm when the vehicle's immobilizing system is activated. Once the vehicle immobilizing system is activated all four (4) brakes of the vehicle will be locked and function as an anti-theft device.

1 Claim, 3 Drawing Sheets

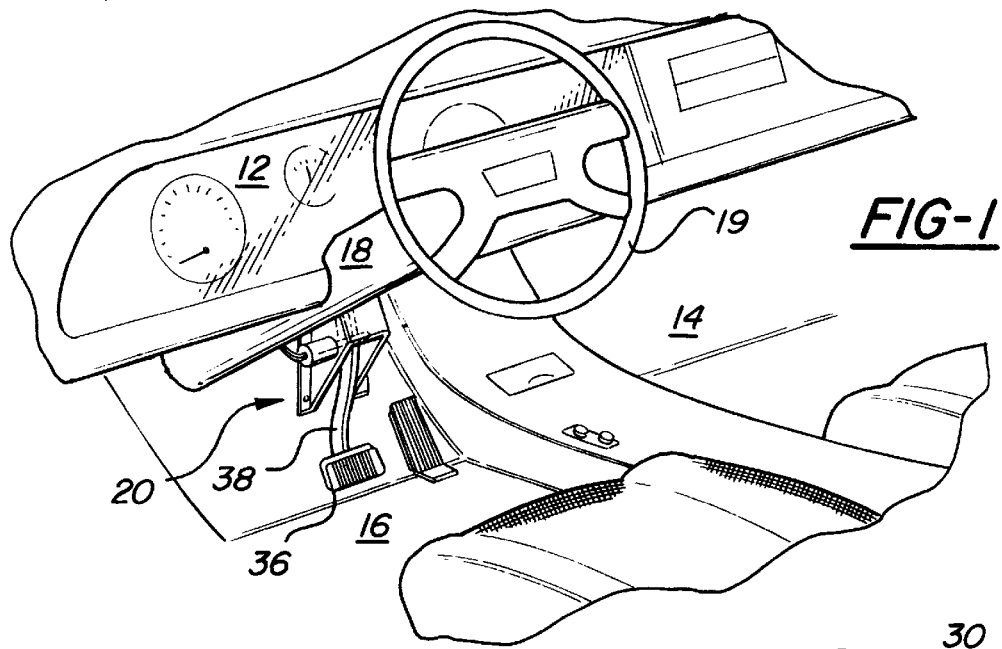
FIG-1
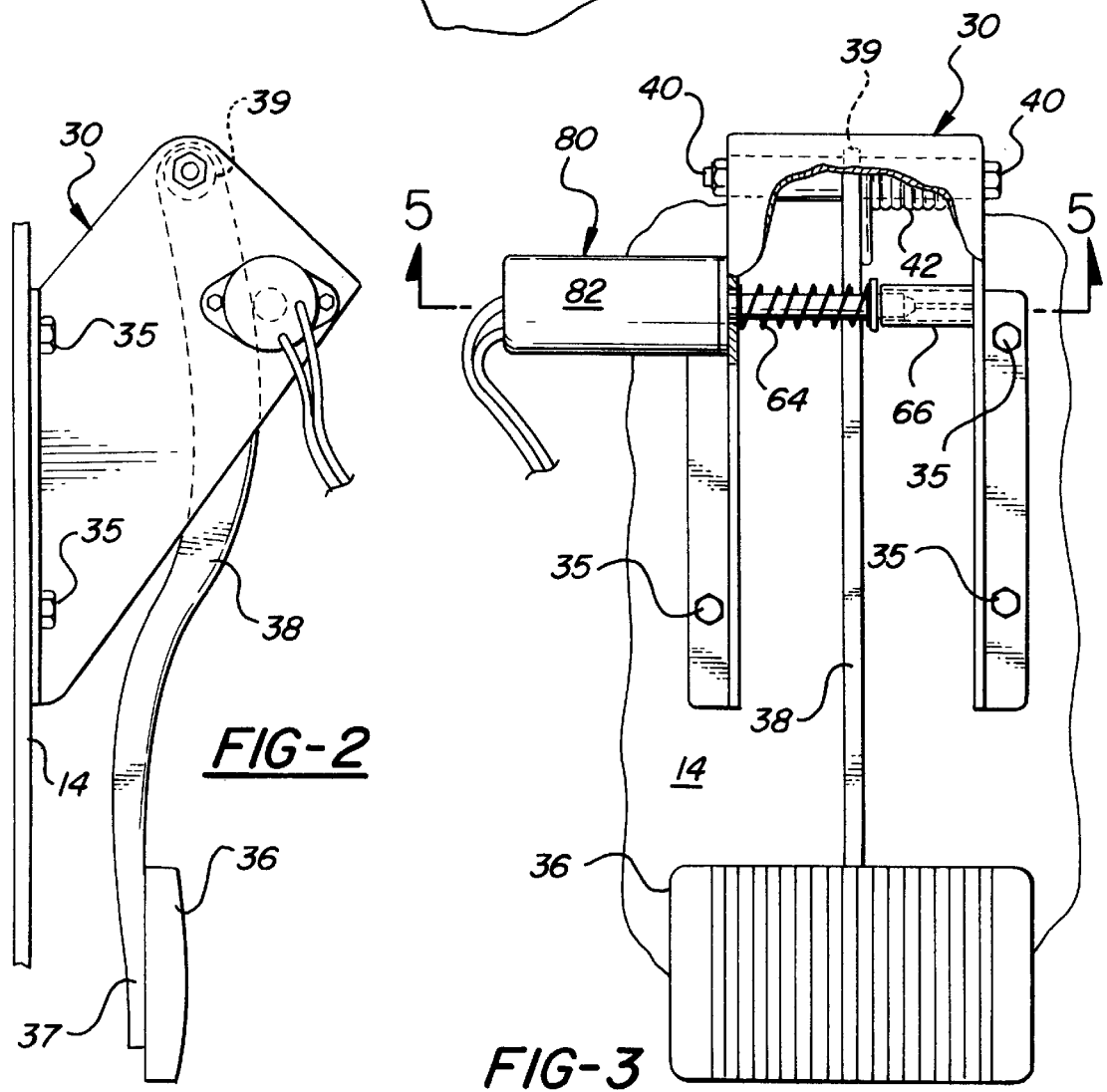
FIG-2
FIG-3

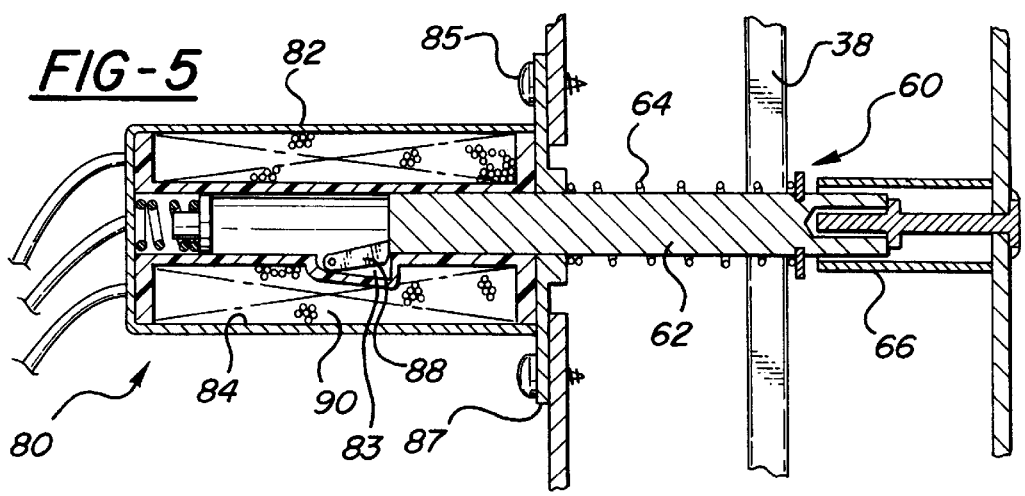
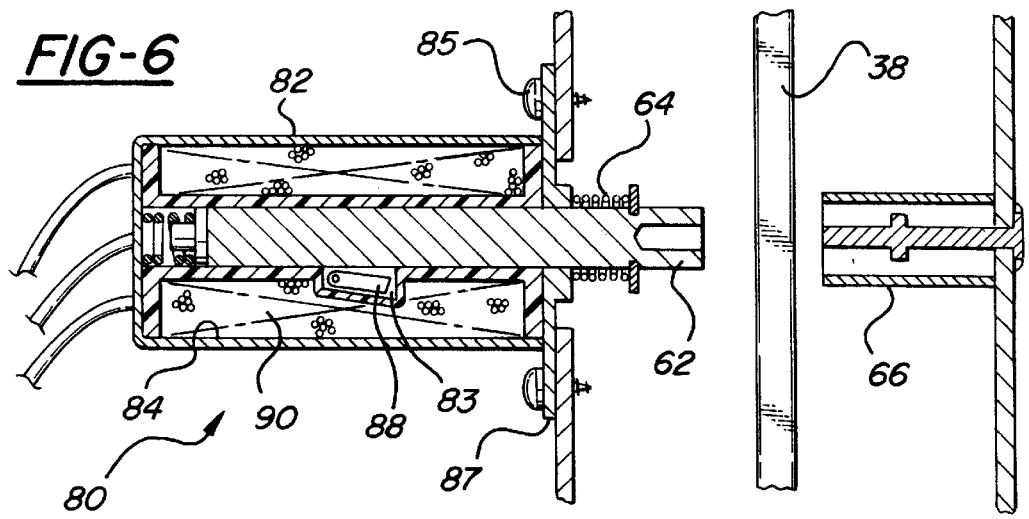
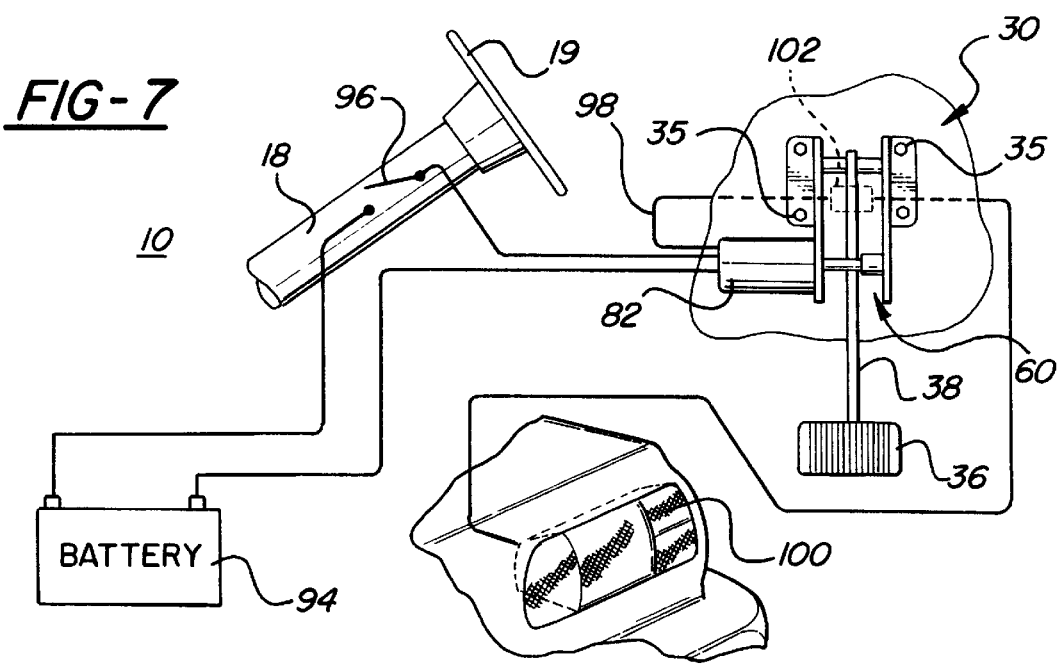

VEHICLE IMMOBILIZING SYSTEM

BACKGROUND OF INVENTION

1. Field of the Invention

This invention is directed towards solving a prior art problem relating to stolen vehicles. As an anti-theft device my Vehicle Immobilizing System holds in an active locked position all four brakes of a parked vehicle without interfering with the normal use of the brakes while driving.

A review of the relevant prior art will show that there have been many products on the market which have attempted to stop the theft of automobiles, but none of these anti-theft devices have been able to stop the towing, pushing or driving of the automobile.

2. Description of Prior Art

There are a variety of prior art anti-theft devices, such as, steering column locks, burglar alarm, automotive hood locks, ignition locks and truck guards, with none of these devices being capable of stopping the driving, towing, or pushing of an automobile.

However, some of the prior art has attempted to address the problem of driving, towing, or pushing away of a stolen vehicle. An example, of such prior art is the Gamboni patent, U.S. Pat. No. 5,001,913 which requires the installation of a large anti-theft lock assembly to the interior of an automobile's firewall and the welding of an intrusive locking bar unto the brake pedal.

Another such unexceptable prior art device is the Knott Jr., patent, U.S. Pat. No. 5,040,387 which utilizes a vehicle anti-theft assembly for locking the brakes of a vehicle by means of a brake pedal engaging means which is disposed within a guide means and mounted through the vehicle's floor board.

Another example of a prior art failure to provide an effective and practical solution to the stealing of vehicles by driving, towing, or pushing them is the Martin patent, U.S. Pat. No. 4,432,432 which utilizes a standard automotive vehicle bumper jack or an apparatus utilizing a cylindrical shaft both or which have a forked lowering portion that engaged the arm of the brake pedal.

It can be appreciated that neither the Gamboni, Martin or Knott Jr. patents disclose nor teach the use of an electric solenoid, whose polarity has been reversed, as a power means, to displace a locking shaft to extend over the top of the pivot arm of a vehicle's brake pedal assembly as my invention has done. It can be further appreciated that my invention unlike the above prior art can be easily installed on any existing vehicle brake assembly, without the use of a complicated anti-theft apparatus such as that disclosed by the Gamboni and Knott Jr. patents.

SUMMARY OF THE INVENTION

In accordance with the present invention, I have invented a new and improved vehicle immobilizing system which functions as an anti-theft device and avoids the many draw back problems of the prior art.

Thus, one of the objects of the present invention is to provide a vehicle immobilizing system anti-theft device which is capable of being utilized on all automobiles.

A further object of the present invention is to provide a vehicle immobilizing system which prohibits the driving, towing, or pushing away of an automobile by a thief.

A further object of the present invention is to provide a vehicle immobilizing system which is economical.

Another object of the present invention is to provide a vehicle immobilizing system with means to shut off the brake lights once the invention is activated.

Another object of the present invention is to provide a vehicle immobilizing system which utilizes a retractable locking shaft having an internal locking tumbler built into the solenoid that prohibits the deactivation of my invention.

Another object of the present invention is to provide a vehicle immobilizing system having a power means, for extending and retracting a retractable locking shaft.

Still another object of the present invention is to provide a vehicle immobilizing system which utilizes a power means consisting of an electric solenoid whose polarity has been reversed so as to allow the locking shaft displacement over the brake pivot arm once the power source is shut off.

Still another object of the present invention is to provide a vehicle immobilizing system which can function as an auxilary parking brake when the vehicle is parked on a hill or steep grade.

Still another object of the present invention is to provide a vehicle immobilizing system which does not hinder normal brake operations.

Further objects and advantages of this invention will be apparent from the following description and appended claims, reference being made to the accompanying drawings forming a part of this specification, wherein like reference characters designate corresponding parts in the several views.

BRIEF DESCRIPTION OF THE DRAWINGS

FIG. 1 is a fragmentary perspective view of the interior of an automobile passenger compartment showing the installation of a vehicle immobilizing system.

FIG. 2 is a side elevational view showing the installation of the vehicle immobilizing system on a standard vehicle brake pedal assembly.

FIG. 3 is a plan view of the vehicle immobilizing system showing the retractable locking shaft disposed over the depressed vehicle brake pivot arm.

FIG. 5 is a cross-sectional view taken in the direction of the arrows along line 5—5 of FIG. 3, showing the extension of the retractable locking shaft into the protective cylinder and alignment pen.

FIG. 6 is cross-sectional view taken in the direction of the arrows along line 6—6 of FIG. 8, showing the retraction of the retractable locking shaft back into the electric solenoid.

FIG. 7 is an electrical schematic diagram of the vehicle immobilizing system electric circuit showing a solenoid power means, system activation switch, brake light switch and power source.

Figure 4:
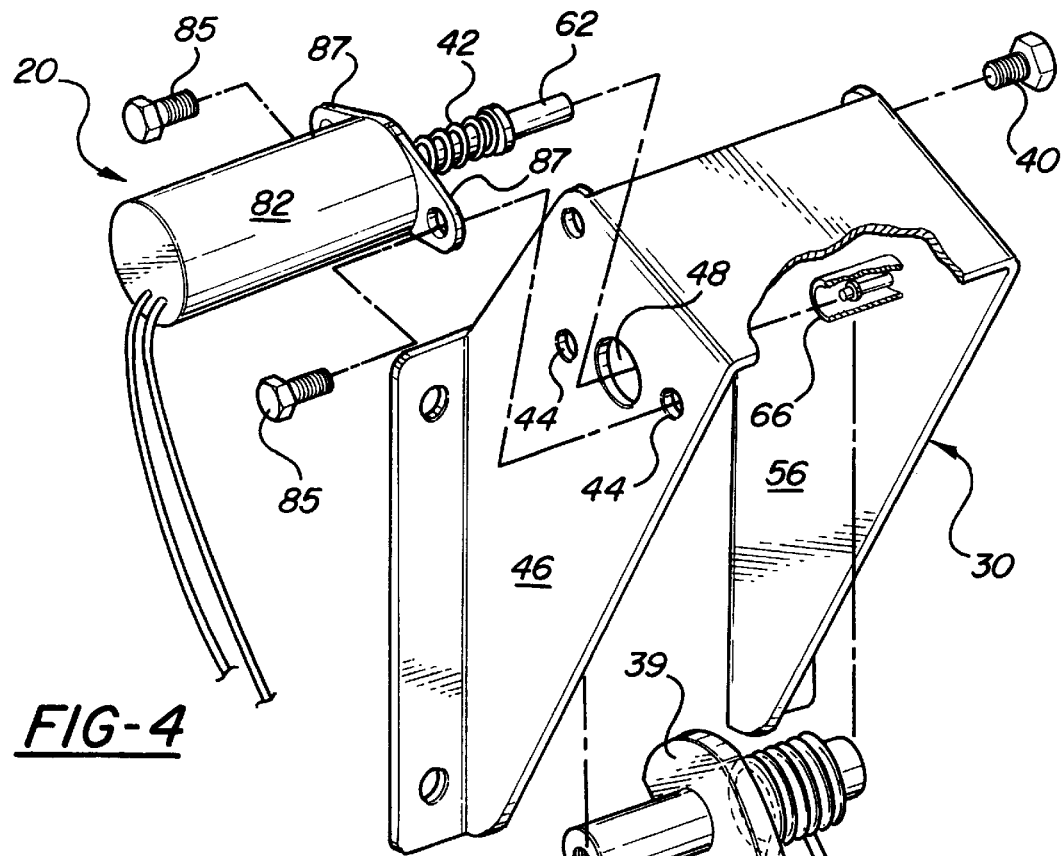
FIG. 4 is an exploded view of a vehicle immobilizing system showing the electric solenoid power means simple construction in proximity of the vehicle brake pedal assembly.

It is to be understood that the present invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for purpose of description and not of limitation.

DETAILED DESCRIPTION OF THE PREFERRED EMBODIMENT OF THE INVENTION

Referring to FIG. 1, a fragmentary perspective view of an automobile passenger compartment 10 shows my Vehicle Immobilizing System generally designated by numeral 20 disposed therein. The automobile passenger compartment 10, is of a standard construction with a dashboard 12, firewall 14, floor 16, steering column 18 and steering wheel 19.

My Vehicle Immobilizing System 20 comprises a vehicle brake pedal assembly 30; locking means 60 attached to said vehicle brake pedal assembly 30; power means 80 for activating said locking means 60; brake light deactivation means 98 which opens the brake light electric circuit when the locking means 60 is activated; and system activation system switch 96 which activates the locking means 60 while at the same time deactivating the vehicle's electric brake lights 100 by brake light deactivation means 98 attached to the standard manufacturers brake light switch 102, as can be best seen by referring to FIG. 7 of the drawings.

The Vehicle Immobilizing System 20 is shown connected to the vehicle brake assembly 30 as can be best seen in FIGS. 2 and 3 of the drawings which shows an elevational and plan view of my invention respectively. The Vehicle Immobilizing System 20 is so designed as to keep the vehicle's brakes locked when the vehicle is parked and the system is activated, but does not interfere with the operation of the brakes when the system is deactivated as the brake pedal pivots back and forth during the vehicle's operation.

Unlike much of the prior art which requires a substantial change to the vehicle's braking system to convert it to an anti-theft use, the only required adaption in the automobile passenger's compartment 10 utilizing my invention is the addition of a system activation switch 96 to the vehicle's steering column 18 and attachment of locking and power means 60, 80 to the existing vehicle brake pedal assembly 30.

The vehicle brake pedal assembly 30 is securely attached to the passenger vehicle's firewall 14 by means of screws 35. The brake pedal 36 is attached to the free end 37 of the brake pivot arm 38, while the fixed end 39 of the brake pivot arm 38 is cooperatively disposed onto brake shaft 41, as can be best seen in FIG. 2.

Figure 8:
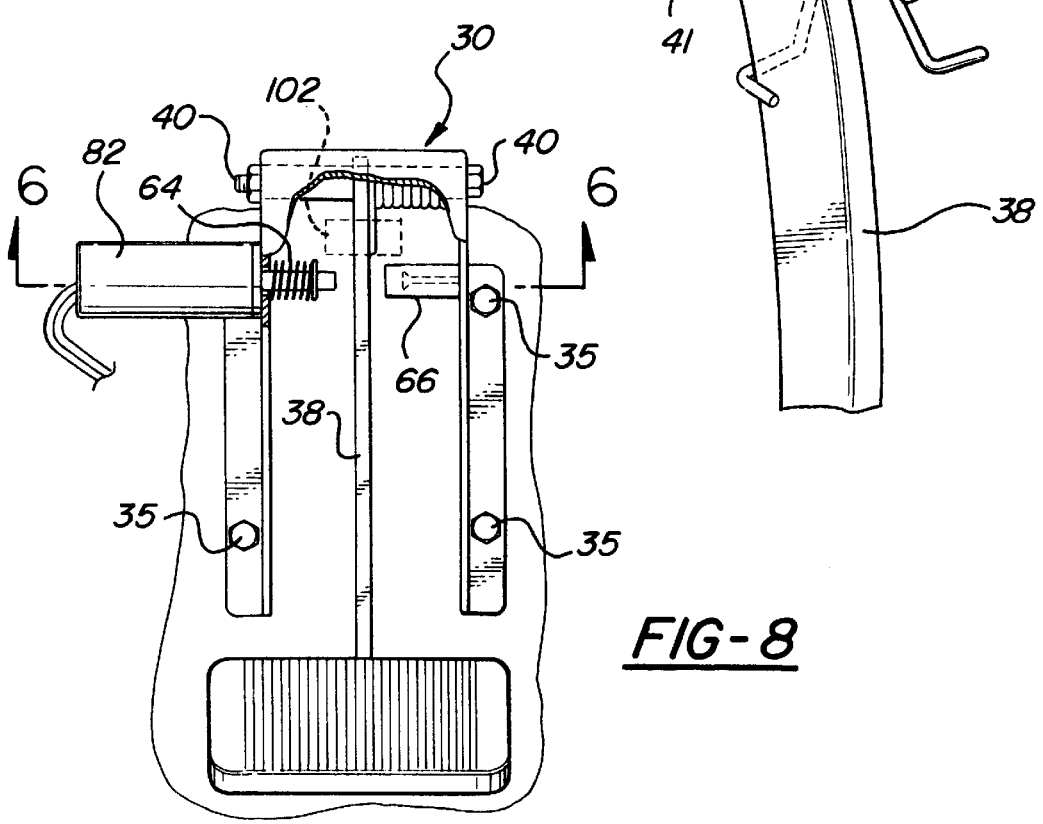
FIG. 8 is a plan view of the vehicle immobilizing system showing the deactivation of said system allowing for the free operation of the brake pedal.

The fixed end 39 of the brake pivot arm 38, as can be best seen in FIG. 4, is mounted to vehicle brake pedal assembly 30 by means of threaded connector structure and brake shaft 41. Shaft 41 has a fixed position as the fixed end 39 of brake pedal pivot arm 38 rotates about brake shaft 41 when brake pedal 36 is displaced by the vehicle operator towards the vehicle's firewall 14. It can be further appreciated that the displacement of the brake pedal 36 will cause brake arm return spring 42 to tighten, therefore, the kinetic energy stored in the brake spring 42 will cause the brake pedal 36 to return to its deactive position, as can be best seen in FIGS. 6 and 8 of the patent drawings when system activation switch 96 is turned off.

The vehicle's braking system can be maintained in an active status by simply keeping the brake pedal pivot arm 38 from returning to its upper at rest position by means of a retractable locking shaft 62, as can be best seen in FIGS. 2, 3 and 5 of the patent drawings.

The power means 80 used to move the retractable locking shaft 62, in this my preferred embodiment of my invention, consists of an electric solenoid 82 as can be best seen in FIGS. 4, 5 and 6 of the patent drawings.

The electric solenoid 82 is connected to vehicle brake pedal assembly 30 by means of flat head machine screws or rivets 85 which cooperatively fit into the solenoid mounting flange 87 located at the end of the electric solenoid 82 and into the machined apertures 44 located on the sidewall 46 of the vehicle brake pedal assembly 30, as can be best seen in FIG. 4. The retractable locking shaft 62 is disposed within large aperture 48 intermediate of the machined apertures 44.

It can be appreciated that the positioning of the two (2) machine apertures 44 and the one (1) large aperture 48 into the sidewall 46 of the vehicle brake pedal assembly 30 has to be carefully made so that the extension of the retractable locking shaft 62 when the vehicle's brake pedal 36 is completely depressed towards the vehicle's floor 16 will be in such a location that it will just clear the brake pivot arm 38, as best seen in FIGS. 2, 3 and 5 of the drawings.

Finally, opposite to the large aperture 48 is disposed a protective cylinder and alignment pen 66 which is suitably attached to sidewall 56 of the vehicle brake pedal assembly 30 so that the retractable locking shaft 62 can be concentrically disposed within protective cylinder and alignment pen 66.

Thus, it can be appreciated that the only modification required for the vehicle brake pedal assembly 30 before the electric solenoid 82 is attached is the addition of the machined and large apertures 44 and 48 to sidewall 46 and the attachment of the protective cylinder and alignment pen 66 to side wall 56.

The electric solenoid 82 has its power source 94 turned off by means of a system activation switch 96 located, as can be best seen in FIG. 7 of the drawings, attached to the vehicle's steering column 18 or any other convenient location such as under the vehicle's dashboard 12.

The electric solenoid 82 is of such a construction so as to reverse its polarity within the electric wire windings 90. Therefore, when the power source 94 is on, the electric solenoid 82 will cause the movement of the retractable locking shaft 62 back into an aperture 83 locked within said solenoid 82 causing the release of the brake pivot arm 38 and the compression of locking spring 64, as can be best seen in FIG. 6 of the drawings. Thus, when the power source 94 to the Vehicle Immobilizing System 20 remains on, the electric solenoid 82 holds the retractable locking shaft 62 in a retracted position which allows the free and unincumbered movement of the vehicle's brake pedal 36 and brake pivot arm 38.

FIG. 5 which is a cross sectional view along dash lines 5—5 in the direction of the arrows in FIG. 3 shows my Vehicle Immobilizing System 20 in an activated status.

It can be appreciated that once the power source 94 is shut off, by means of the system activation switch 96 the kinetic energy stored in the compressed locking spring 64 will cause the retractable locking shaft 62 to be disposed within the protective cylinder and alignment pen 66 located on the opposite side of the brake pedal assembly 30 to which the electric solenoid 82 is attached. While I have disclosed the use of a power means 30 which utilizes an electric solenoid 82 using a power source 94 consisting of a 12 volt DC battery as my preferred embodiment of my invention, it can be further appreciated that the power means 80 could also utilize either hydraulic or mechanical means which would require a different type of power source 94 than a 12 volt DC battery.

Referring again to FIG. 5 of the patent drawings, you will notice that when the power source 94 is turned off by the system activation switch 96, and with the vehicle's brake pedal 36 in a depressed position (active) that the retractable locking shaft 62 has been displaced by the kinetic energy of the locking spring 64 over the top of the pivot arm 38 and seated into the protective cylinder and alignment pen 66. With the retractable locking shaft 62 disposed within the protective cylinder and alignment pen 66 it cannot be physically forced back into the electric solenoid 82 to allow the deactivation of the vehicle's brakes due to the obstruction of the internal locking tumbler 88.

The internal locking tumbler 88 is located within the electric solenoid 82 behind the retractable locking shaft 62. When the solenoid 82 is turned off the locking shaft 62 extends over the brake pedal pivot arm 38 in a locked position. The locking shaft 62 is prevented from moving back from its extended position by means of an internal locking tumbler 88 disposed within said electric solenoid 82, so as to prevent the retraction of the locking shaft 62 when the electric solenoid is turned off, as can be best seen in FIG. 5. The internal locking tumbler 88 has been designed to prevent the retractable locking shaft 62 from being forced back into the electric solenoid 82 when the locking shaft 62 is extended. Once the electric current is turned on the internal locking tumbler 88 moves back towards the interior wall 84 of the electric solenoid 82, as can be best seen in FIG. 6, allowing the retractable locking shaft 62 to retract back into the aperture 83 of the electric solenoid 82, which in turn allows the vehicle's brake pedal 36 to be disengaged allowing for the normal operation of the vehicle, as can be best seen in FIG. 6 of the drawings. Thus, it can be appreciated that once a vehicle's braking system is activated it is extremely difficult for a vehicle utilizing my invention to be stolen, since it cannot be driven, pushed, or towed away.

Further, once the system activation switch 96 is turned off, not only is the power source 94 cut off from the electronic solenoid 82, but it also, as can be best seen by referring to FIG. 7 of the drawing, which is an electric circuit diagram of my invention, shuts off the power supply to the electric brake lights 100, otherwise the DC power supply to the vehicle would be drained. The brake lights are controlled by means of a brake light switch 102 located on the vehicle's firewall 14 behind the brake pedal assembly 30 which is disengaged by the system activation switch 96.

Finally, once my Vehicle's Immobilizing System 20 is turned back on, it will cause the release of the retractable locking shaft 62 from the internal locking tumbler 88 and its displacement back into the aperture 83 located within the electric solenoid 82 and the activation of the vehicle's brake lighting system, as can be best seen in FIG. 6 of the drawings.

Applicant having already described the preferred embodiment of his vehicle anti-theft device, now wishes to describe how best to use the same.

Once the driver of the automobile is ready to park the vehicle my Vehicle Immobilizing System 20 can be activated by:

1. Engaging the vehicle's brakes before shutting off the engine by fully depressing the brake pedal;
2. Turning off the vehicle's system activation switch;
3. Removing the operator's foot from brake pedal; and
4. Shutting off the vehicle's engine.

Conversely, my Vehicle Immobilizing System 20 can be deactivated by:

1. Turning on the vehicle's engine;
2. Depressing the vehicle's brake pedal;
3. Turning on the vehicle's system activation switch; and
4. Releasing the vehicle's brake pedal.

Thus, by abandoning previous prior art construction utilizing bars attached to a vehicle's steering wheel, or bars extending to a vehicle's brakes and eliminating the necessity of making major physical alterations of a vehicle's brake pedal apparatus, I have invented a Vehicle Immobilizing System 20 which is simple, practical, economical, and attractive in appearance which solves the many prior art problems associated with prior art expensive and massive anti-theft devices.

I claim:

1. In a vehicle having a brake pedal arm (36) movable between a raised condition for releasing the vehicle brakes and a lowered condition for operating the vehicle brakes, a battery power source (94), and a brake light (102) connected to said power source so as to be illuminated when said brake pedal arm is in its lowered condition during normal operation of the vehicle; the improvement comprising:

a mechanism for temporarily retaining said brake pedal arm in its lowered condition while at the same time disconnecting said brake light from said battery power source;

said mechanism comprising a shiftable locking shaft (62) having a locking position preventing movement of the brake pedal arm from its lowered condition, said shiftable locking shaft having an unlocked position wherein the brake pedal arm can be freely moved between its raised and lowered conditions;

a spring means (64) biasing said locking shaft to its locking position;

an electrical solenoid means (82) for moving said locking shaft from its locking position to its unlocked position when said solenoid means is electrically energized;

an electrical activation circuit connecting said battery power source to said electrical solenoid means;

said electrical activation circuit comprising a manual switch (96) having a first circuit-closed position wherein said solenoid means is energized and a second circuit-open position wherein said solenoid means is de-energized;

a brake light energization circuit normally connecting the aforementioned brake light to the battery source;

said activation circuit being connected to said brake light energization circuit so that when said manual switch is in said circuit-open position, said brake light energization circuit is electrically disconnected from said battery power source;

said solenoid means comprising an internal locking tumbler (88) having a first position preventing movement of said locking shaft from said locking position to said unlocked position;

said internal locking tumbler having a second position permitting movement of said locking shaft between said locking position and said unlocked position;

said internal locking tumbler being controlled by said solenoid means so that when the solenoid means is energized, the tumbler is in said second position, and when the solenoid means is de-energized the tumbler is in said first position.

* * * * *